United States Patent [19]

Sherman

[11] Patent Number: 4,565,382

[45] Date of Patent: Jan. 21, 1986

[54] COMBINED PORTABLE TABLE AND HAND TRUCK

[76] Inventor: William S. Sherman, 132 Belle Ave., Highland Park, Ill. 60035

[21] Appl. No.: 592,593

[22] Filed: Mar. 23, 1984

[51] Int. Cl.⁴ ............................................. B62B 1/12
[52] U.S. Cl. .................................. 280/47.18; 108/18; 280/47.29
[58] Field of Search ........................ 248/164; 414/912; 108/11, 18; 297/118; 280/47.29, 47.17, 47.18, 47.19, 47.27, 47.28

[56] References Cited

U.S. PATENT DOCUMENTS

| | | | |
|---|---|---|---|
| 2,433,886 | 1/1948 | Bremer | 280/47.19 X |
| 2,809,047 | 10/1957 | Strohmaier | 280/47.27 X |
| 2,843,391 | 7/1958 | Pelletier | 108/18 X |
| 3,008,463 | 11/1961 | Frank | 108/11 X |
| 3,064,989 | 11/1962 | Bellows | 280/47.18 X |
| 3,685,824 | 8/1972 | Quinn | 248/164 X |
| 4,037,858 | 7/1977 | Adams | 280/47.29 X |
| 4,284,286 | 8/1981 | Lewallen | 280/47.28 X |
| 4,290,625 | 9/1981 | Barriere | 280/47.28 X |

FOREIGN PATENT DOCUMENTS

| | | | |
|---|---|---|---|
| 392864 | 10/1908 | France | 280/47.29 |
| 404928 | 4/1932 | United Kingdom | 280/47.28 |

Primary Examiner—Joseph F. Peters, Jr.
Assistant Examiner—Michael Mar
Attorney, Agent, or Firm—Welsh & Katz, Ltd.

[57] ABSTRACT

A combined portable table and hand truck particularly adapted for use as a picnic or camping table and for transporting picnicing and camping equipment and supplies, includes a table top supported by a pair of hingedly connected U-shaped members, one of which at the outer portions of its legs being hingedly connected to depending portions of the table top and its middle or center portion contacting the ground surface, while the other U-shaped member at the outer portions of its legs supports wheel supporting member and a pair of ground surface-engaging wheels and its middle portion is adapted to abut tubular members serving as stops for positioning the table top in either a raised erected position or a lower erected position. The portable table and hand truck includes a load supporting rack mounted to the wheel supporting member which is selectively positionable and retainable through at least one chain or strap and hook device in a load supporting position for transporting the table and equipment and supplies. The rack and U-shaped supporting members collapse to lie substantially flat against the underside of the table top so as to be easily stored and transported.

16 Claims, 6 Drawing Figures

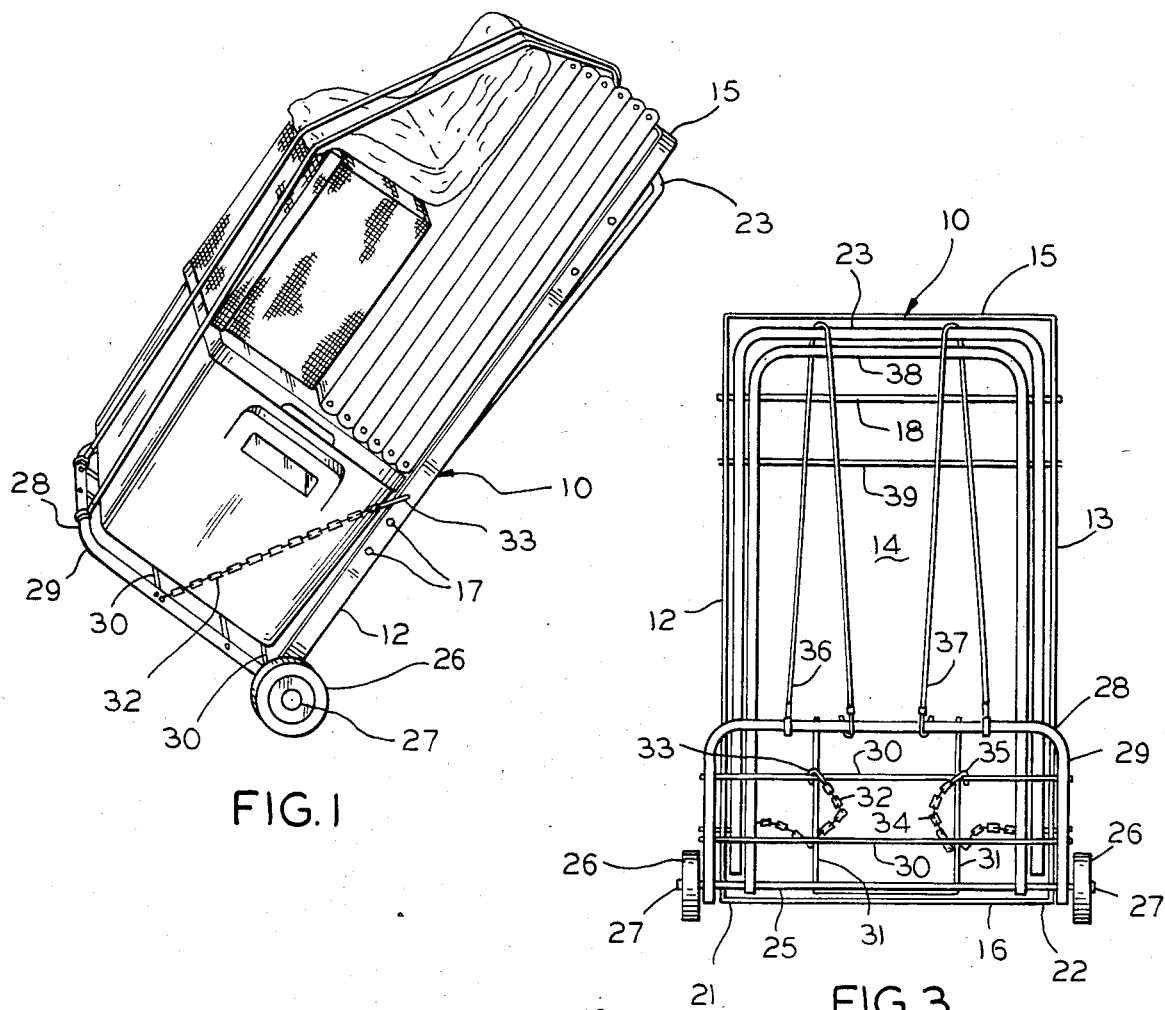
FIG. 1
FIG. 3
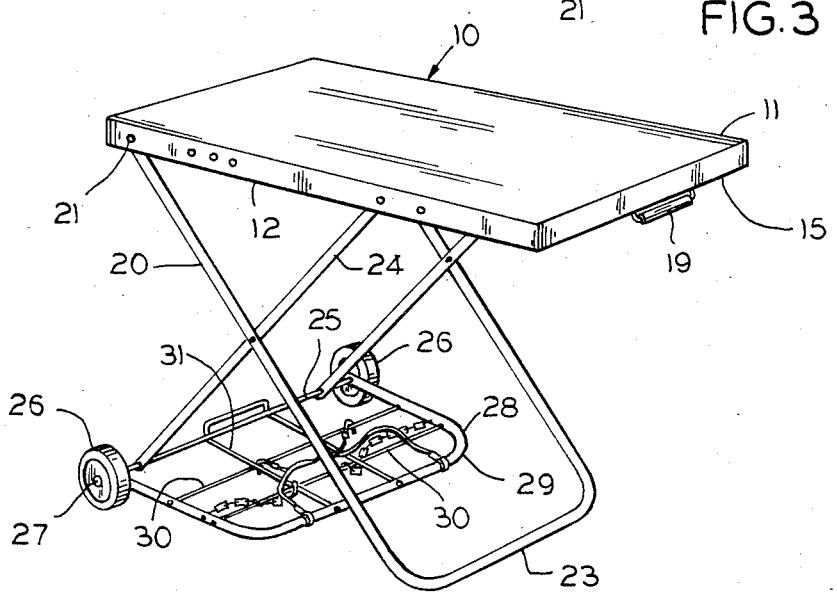
FIG. 2

COMBINED PORTABLE TABLE AND HAND TRUCK

BACKGROUND OF THE INVENTION

The present invention relates to a portable table, such as the type used for picnics and camping, and more particularly to a combined portable table and hand truck which is particularly adapted for use as a picnic or camping table and for transporting picnicking and camping equipment and supplies.

Collapsible, lightweight picnic tables have found wide utility, primarily for use in leisure time activities, such as picnics and camping. While the conventional picnic table is portable in the sense that it can be carried from place to place, and is storable in a collapsed condition, transportation of the table for more than short distances without the aid of a vehicle to transport the table becomes burdensome. Additionally, while the conventional picnic table can be carried, it is an additional burden when other equipment and supplies, for example, chairs, coolers, food, beverages, dinnerware, utensils, etc., must also be carried to the site at which the table is to be used. Hence, the transportation of the conventional picnic table for more than a short distance is impractical unless additional vehicular means or several persons are available to transport the table, supplies and other equipment to the desired site.

BRIEF SUMMARY OF THE INVENTION

An object of the invention, therefore is the provision of a self-contained portable table having transportation means and load carrying means for transporting the table and a load, particularly equipment and supplies utilized in picnicing and camping.

Another object of this invention is the provision of a combined portable table and hand truck which is erectable to provide a table at a plurality of height differing positions, is collapsible for storage in a substantially flat condition, and is partially erectable to provide for load carrying and retaining while being transportable to a desired site.

Further objects and advantages of this invention will become apparent from the following description when the same is considered in connection with the accompanying drawings.

In accordance with the present invention, there is provided a portable table and hand truck having a substantially planar table top having at least a pair of depending portions extending from the undersurface of the top, and first and second members for supporting the top, the first member being hingedly connected to the pair of depending portions of the table top, and the second member being hingedly connected with the first member. The portable table and hand-truck further has at least one stop means positioned adjacent the undersurface of the top for receiving a portion of the second member in abutting relation with the stop means and the table top upon selective erection of the first and second members. The portable table and hand truck also has wheel supporting means mounted to an outer end portion of the second member for rotatably supporting a pair of wheels thereon and a pair of ground surface-engaging wheels rotatably supported by the wheel supporting means. Additionally, the portable table and hand truck includes a load supporting rack hingedly connected to the wheel supporting means, and load supporting rack retaining means mounted on the rack for retaining the rack in a selected position with respect to the table top.

The portable table and hand truck is preferably constructed with the first and second members being U-shaped members, and with the two legs of the first U-shaped member having its two legs hingedly connected at the outer end portions thereof to the pair of depending portions and with the two legs of the second U-shaped member being hingedly connected to the two legs of the first U-shaped member. Additionally, the second U-shaped member is preferably positioned interiorly of the first U-shaped member and being collapsible therewithin so as to reside in substantially the same plane adjacent the underside of the table top upon the portable table and hand truck being in its collapsed condition. The device of the present invention preferably includes a plurality of stop means, each of which are positioned adjacent the underside of the table top and are spaced from each other for selectively erecting the table top in a plurality of height differing positions by receiving the middle portion or bight of the second U-shaped member in abutting relation with one of the plurality of stop means and the table top. The stop means preferably includes a tubular member extending between and mounted to the pair of depending portions spaced from the underside of the table top a sufficient distance, but also can be a projection extending from the underside of the table top as by molding therewith to enable the middle portion of the second U-shaped member to be retained in abutting relationship thereagainst and against the underside of the table top upon erecting the table.

The load supporting rack of the portable table and hand truck of the present invention is hingedly mounted to the wheel supporting means so as to be rotatable thereabout so as to selectively be substantially against either side of the second U-shaped member, i.e., through an angle of slightly less than 360 degrees when the table is in an erected condition, and through an angle of only slightly less than the previously described angle when the table is in the collapsed position. Rotation of the load supporting rack about the wheel supporting means is facilitated by having the load supporting rack include a third U-shaped member having the end portions of its legs rotatably mounted to the wheel supporting means and, preferably, having the legs of the third U-shaped member being positioned exteriorly along the wheel supporting means with respect to the legs of the second U-shaped member. The load supporting rack preferably also includes a plurality of load supporting members extending between and mounted to the legs of the third U-shaped member, and additionally includes a fourth U-shaped member having its legs mounted to the middle portion of the third U-shaped member and extending at least partially about the wheel supporting means. The load supporting rack can also be a molded assembly, or an assembly including strap or web load supporting members.

Portable tables and hand trucks constructed according to the present invention provide novel portable tables which are erectable into a plurality of height differing positions, particularly useful as a low or cocktail height table where the users of the table are seated or reclining upon the ground, and at common dining or work table-height where the users of the table are to be seated upon chairs about the table, as well as each table construction providing a pair of wheels and wheel supporting structure for easily transporting the table, and further a load supporting rack on which a load, for example, equipment such as collapsible folding chairs, coolers, etc. and supplies can be placed for transportation with the table. The portable table and hand truck can also be collapsed into a substantially flat condition for storage and for transportation within or on a vehicle.

BRIEF DESCRIPTION OF THE DRAWING

FIG. 1 is a perspective view of a combined portable table and hand truck of the present invention illustrating the use of the device for transporting equipment and supplies;

FIG. 2 is a perspective view of the combined table and hand truck of FIG. 1 in the raised, erected position;

FIG. 3 is a plan view of the device shown in FIGS. 1-2, in the folded or collapsed position and inverted for storage or transportation in a vehicle;

BRIEF DESCRIPTION OF A PREFERRED EMBODIMENT

Figure 4:
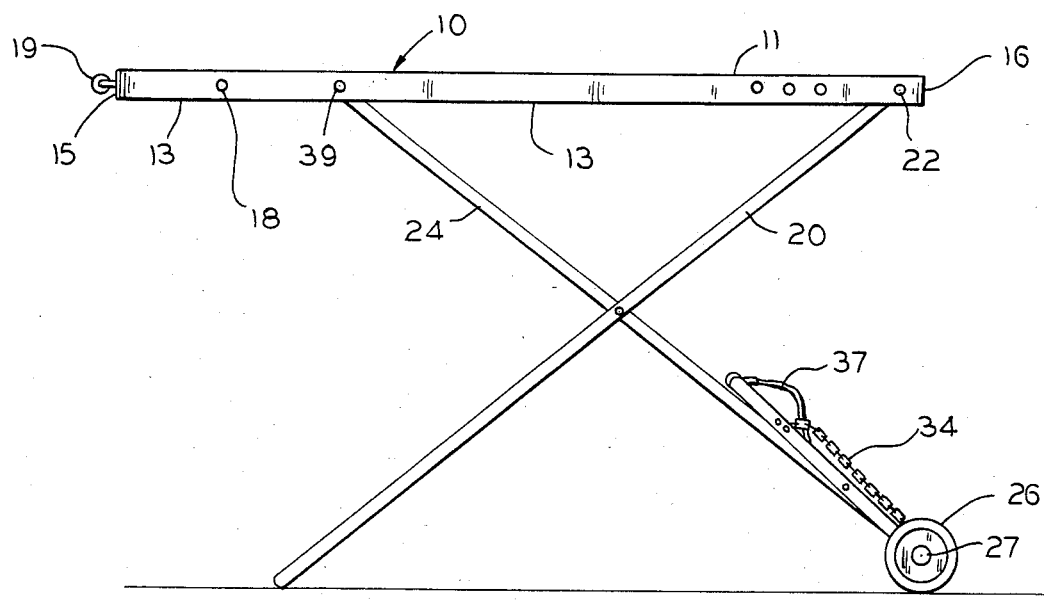
FIG. 4 is a front elevational view of the embodiment shown in FIGS. 1-3 showing the table in the raised, erected condition.
Figure 5:
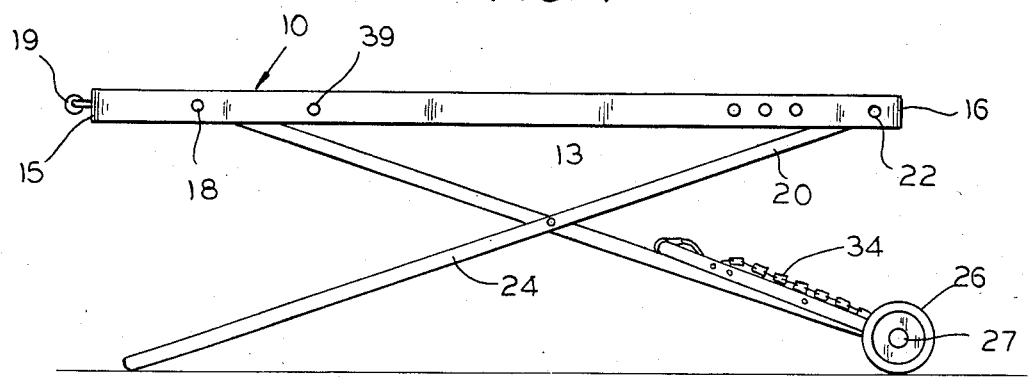
FIG. 5 is a front elevational view of the same embodiment showing the table in the lower, erected position.
Figure 6:
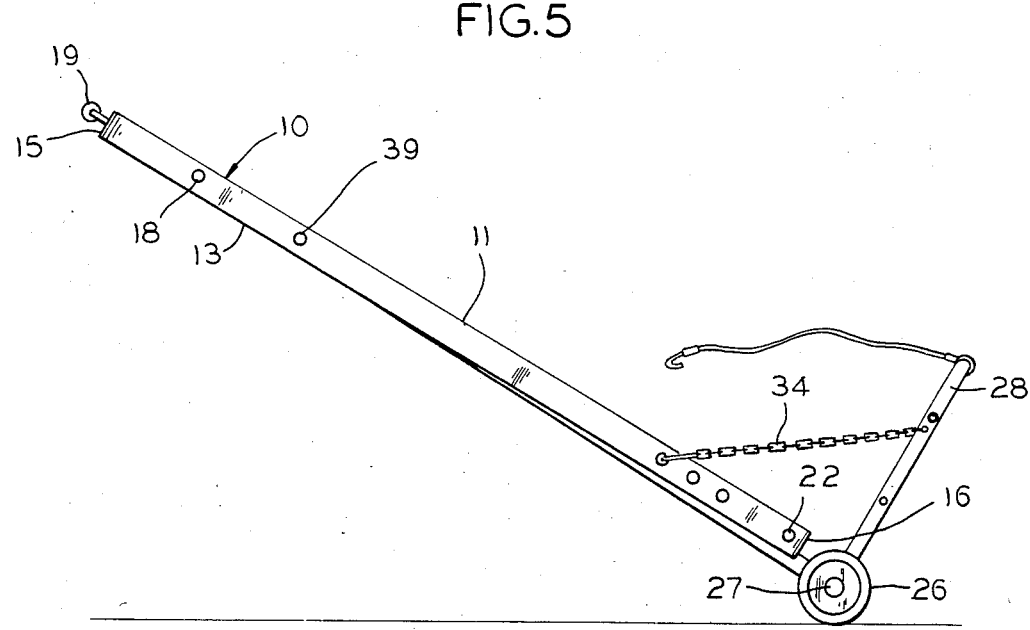
FIG. 6 is a front elevational view of the combined table and hand truck of the invention showing the table in a folded or collapsed condition with the load supporting rack extended for use for transporting the device and a load to be placed thereon.

In the particular construction shown in the drawing, the numeral 10 indicates, generally, a portable table and hand truck, hereinafter referred to as table 10, in accordance with the present invention. Table 10 includes a substantially planar table top 11 having at least a pair of depending portions 12 and 13 extending from one surface, preferably the undersurface 14 of top 11. Preferably, depending portions 12, 13 are integral with top 11 and extend generally perpendicularly from the side edges of the top 11. Table 10 further preferably includes depending end portions 15, 16 integral with top 11 and extending generally perpendicularly from the end edges of top 11 and from the same surface, i.e., undersurface 14 of top 11. Furthermore, depending end portions 15, 16 are integral with depending portions 12, 13 forming the depending corners of table top 11. Depending portions 12, 13 define a plurality of hook receiving apertures 17 which are spaced apart from each other. Preferably, the hook receiving apertures in one of the depending portions 12, 13 are aligned with the similar apertures in the other of the depending portions 12, 13. Depending portions 12, 13 also support at least one tubular member 18 extending between and mounted to the depending portions 12, 13, which serves as stop means for receiving a supporting member of the table 10, as will be hereinafter described. Tubular member 18 can be a rod, or tube or other device fastened to the depending portions by the use of fasteners, welding or other means known to the art. Table 10 can also include a handle 19 which can be fixed to depending end portion 15 as shown in FIGS. 4-6, or can be foldable and extend from the inner surface of depending edge portion 15, as shown in FIG. 2. Table top 11 and depending portions 12, 13, 15, 16, can be made of lightweight metal, such as aluminum, or can be made of plastic material, such as by injection or as a structural foam construction.

Table 10 includes a first U-shaped tubular member 20 for supporting top 11. Member 20 is hingedly connected to depending portions 12, 13 of top 11 by having the outer end portions of its two legs hingedly connected thereto, for example, by fasteners 21 and 22. Member 20 is hingedly connected to depending portions 12, 13 adjacent to depending end portion 16 of table 10. Middle portion 23 of member 20 is adapted to engage the ground surface to support the table in an erected condition, and is further adapted to be collapsed within the depending portion of table 10 in the collapsed position, as best shown in FIG. 3.

Table 10 further includes a second U-shaped member 24, which like member 20, is preferably tubular and formed of lightweight material, such as aluminum tubing. Member 24 is hingedly connected to member 20 by having its two legs hingedly connected with the legs of member 20, preferably at the mid-portions of legs of member 24 to the legs of member 20 at a distance along the legs of member 20 closer to its end portions than its middle portions to support table top 11 in a position substantially parallel to the ground surface in the erected condition irregardless of whether table 10 is in the raised erected position or in the lower erected position. U-shaped members 20 and 24 together form a tubular frame which supports table top 11 in at least one erected condition as will be hereinafter described.

The outer end portions of the legs of U-shaped member 24 support a tubular member 25 mounted thereon which serves as wheel supporting means of table 10. Member 25 can be a rod or a tubular member, and rotatably supports a pair of round surface-engaging wheels 26 adjacent its ends. Wheels 26 can be rotatably held to member 25 by means of cap-nuts 27 or other fasteners known to the art.

Table 10 further includes a load supporting rack 28 hingedly connected to member 25. Rack 25 can include a third U-shaped member 29 having the end portions of its legs rotatably mounted to member 25, and can include a plurality of load supporting members 30 extending between and mounted to the legs of member 29. Rack 28 can also include a fourth U-shaped member 31 having its legs mounted to the middle portion of member 29 and extending at least partially about member 25, as best shown in FIGS. 2 and 3. Member 31, as well as load supporting member 30 can be of tubular construction, preferably having an outside diameter smaller than that of member 29. The legs of member 31 can be fastened to load supporting members 30 at their points of contact, for example by welding, and also at their points of contact with member 30, if member 30 is not intended to be freely rotatable with respect to wheels 26.

Table 10 also includes load supporting rack retaining means for retaining rack 28 in a selected position with respect to top 11. The rack retaining means, as shown, is preferably at least one chain 32 which is mounted at one end to one of the legs of U-shaped member 29 of rack 28. The opposite end of chain 32 includes a hook 33 which is adapted to engage one of the hook receiving apertures 17 defined by depending portion 12. Preferably, the rack retaining means includes a second chain 34 similarly mounted at one end to the other leg of U-shaped member 29 and having a hook 35 at its other end adapted to removably engage any of the hook receiving apertures 17 defined by depending portion 15. Chains 32 and 34 with their hooks 33 and 35, respectively, engageable with the hook receiving apertures 17 of the respective depending portions 12, 13 provide for supporting and retaining rack 28 in a plurality of load supporting positions with respect to top 11 depending upon the apertures 17 which are selectively engaged by the hooks.

Table 10 preferably additionally includes second load retaining means extending from load supporting rack 28 to the undersurface 14 of table top 11 for retaining a load supported on the load supporting rack 28. Preferably, the second load retaining means includes at least one strap 36 having one of its end portions removably retained on the middle portion of U-shaped member 29 of rack 28, and the other end portion of strap 36 similarly removably retained on member 18, for example, by providing hooks on the end portions of strap 36 which are adapted to be releasably hooked about the respective members. Preferably, the second load retaining means includes a pair of straps 36, 37 positioned outwardly with respect to the legs of U-shaped member 31. Most preferably, straps 36, 37 are self-extendable and retractable cords, for example, of shock cord material.

In the preferred embodiment shown in the drawing, table 10 is provided with a pair of rods or tubular members 18, 39 mounted on depending portions 12, 13. Members 18, 39 are spaced from each other along depending portions 12, 13 for selectively erecting table top 11 in a plurality of height differing positions. Members 18, 39 serve as stop means for U-shaped member 24 by receiving the middle portion 38 of member 24 in abutting relation with either of members 18, 39 and the undersurface 14 of top 11. By positioning members 18, 39 in spaced relation to undersurface 14 of top 11, a distance of slightly more than one-half of the diameter of middle portion 38 of member 24, middle portion 38 can be securely, but removably retained against the stop means, i.e., member 18 or 39 and table top 11 to support top 11 in one of two height differing positions with respect to the ground surface, particularly upon the placing of weight upon the top of table top 11. In erecting table 10, U-shaped members 20 and 24 act in scissors manner to maintain a substantially parallel relation between the top of table 11 and the ground surface engaging portions of middle portion 23 of member 20 and wheels 26.

To erect the table, the center or middle portion 23 of member 20 is pushed away from top 11, which causes the ends of the legs of member 24, supporting member 25, and hence wheels 26, and load supporting rack 28, to be positioned away from top 11. The center or middle portion 38 of U-shaped member 24 can be positioned against either member 18 or 39, serving as stop means, and undersurface 14 of top 11. In such position, the center or middle portion 23 of member 20 and wheels 26 contact the ground surface with U-shaped members 20 and 24 supporting the table top 11. Table 10 can be positioned by raising the middle portion of member 20 slightly off the ground surface and rolling table 10 by means of wheels 26 to the desired position. Handle 19 can be used to raise the end of the table and pull or push the table into the desired position. By positioning the middle portion 38 of member 24 against member 18, the table will be supported in the lower position, e.g., at cocktail table height, as best shown in FIG. 5; while by positioning middle portion 38 of member 24 against member 39, table 10 will be supported in the higher position, e.g., at dining table or work table height, as best shown in FIG. 4.

The combined table and hand truck can be converted to a hand truck by rotating load supporting rack 28 about member 25 forward of the end of table top 11 and releasing the middle portion 38 of member 24 from members 18 and 39. In this position, the U-shaped members 20 and 24 can be folded or collapsed against undersurface 14 of top 11 to form the folded or collapsed position of the device. Rack 28 can now be positioned in a selected position or angle with respect to top 11 by positioning hooks 33, 35 on the free ends of chains 32, 34 into an aligned pair of the apertures 17 in depending portions 12, 13. Objects to be transported by the device of the present invention, such as ice chests or coolers, folding chairs, picnic baskets, blankets, and the like, can be placed upon rack 28 and against top 11 as illustrated in FIG. 1. Straps 36 and 37 can be attached, as previously described, between the middle portion of member 29 of rack 28 and either of members 18, 39, to retain such objects in position as illustrated in FIG. 1.

The combined table and hand truck is easily stored in a collapsed condition from the folded condition by disengaging straps 36, 37, disengaging hooks 33, 35 from apertures 17, and rotating rack 28 about member 25 until the middle portion of member 29 of rack 28 abuts the underside of the legs of member 24. In this collapsed condition, the combined device of the present invention can be stored or transported while in a relatively flat condition, either by standing vertically on wheels 26 or by being laid flat against a supporting surface. Rack 28 can be held against the underside of member 24 and members 20 and 24 against the underside 14 of top 11 by fastening straps 36, 37 between rack 28 and one of members 18, 39.

As best shown in FIG. 3, storage in a collapsed condition and transportation in that condition, is aided by positioning member 24 interiorly of member 20 and by positioning U-shaped member 29 of rack 28 exteriorly of members 20 and 24 along member 25, and preferably exteriorly of the sides and depending portions 12, 13 of top 11. In this manner, rack 28 can be easily rotated about member 25, while members 20 and 24 can be collapsed so as to lie substantially flat against the underside 14 of table top 11 to the extent permitted by the presence of members 18 and 39.

As heretofore noted, the portable table and hand truck of the present invention can be readily converted, without the use of tools, from a portable table in a raised or lower position, to a hand truck particularly adapted for carrying camping and picnicing equipment, and to a collapsed, relatively flat condition for easy storage and transportion of the device.

Various changes coming within the spirit of my invention may suggest themselves to those skilled in the art; hence, the invention is not limited to the specific embodiments shown and described or use as mentioned, but the same is intended to be merely exemplary, the scope of the invention being limited only by the appended claims.

What is claimed is:

1. A portable table and hand truck comprising:
   a planar table top having first and second ends and having side edges, and having depending portions extending from one surface of said table top at said side and end edges;
   a first U-shaped member having a pair of legs and a bight portion therebetween for supporting said top, said U-shaped member being hingedly connected at the end portions of its legs to said depending portions extending from said one surface at the side edges thereof adjacent the first end of said table top, and being selectively erectable and collapsible with respect to the table top;

a second U-shaped member having a pair of legs and a bight portion therebetween for supporting said top, said second U-shaped member being hingedly connected to said first U-shaped member and selectively erectable and collapsible with said first U-shaped member with respect to said table top, the bight portion of the second U-shaped member being oriented towards said planar table top, said second U-shaped member being collapsible so as to reside in substantially the same plane adjacent the underside of said table top;

a plurality of stop means each positioned adjacent the said one surface of said table top and spaced from each other for selectively erecting said table top in a plurality of height differing positions by receiving the bight portion of said second U-shaped member in abutting relation with one of said plurality of stop means and said table top;

wheel supporting means mounted to an outer end portion of the legs of said second U-shaped member for rotatably supporting a pair of wheels thereon;

a pair of ground surface-engaging wheels rotatably supported by said wheel supporting means;

said table top having handle means secured to the depending portion extending from the second end of said top;

a load supporting rack hingedly connected to said wheel supporting means so as to be rotatable thereabout, said load supporting rack comprising a third U-shaped member having the end portions of its legs rotatably mounted to said wheel supporting means; and load supporting rack retaining means mounted on said load supporting rack for retaining said rack in selected positions with respect to said table top;

wherein said portable table and hand truck is erectable as a table in a plurality of height differing and transportable positions with the said first and second U-shaped members erected, wherein said portable table and hand truck is erectable as a hand truck with the said load supporting rack erected and the said first and second U-shaped members collapsed, and wherein said portable table and truck is collapsible into a substantially flat condition for storage and for transportation with said load supporting rack and said first and second U-shaped members collapsed.

2. The portable table and hand truck defined in claim 1, wherein said second member is positioned interiorly of said first member and is collapsible therewithin so as to reside in substantially the same plane adjacent the underside of said table top.

3. The portable table and hand truck as defined in claim 1, wherein said second member is hingedly connected at approximately the midportions of the legs thereof to the legs of the first U-shaped member at approximately the midportions thereof.

4. The portable table and hand truck as defined in claim 1, wherein the stop means comprise a tubular member extending between and mounted to said pair of depending portions.

5. The portable table and hand truck as defined in claim 1, wherein said load supporting rack is hingedly mounted to said wheel supporting means so as to be rotatable thereabout so as to selectively lie substantially against either side of said second U-shaped member for transporting, for storage of said rack upon erecting of said table, and for storage of said table in a substantially flat, collapsed condition.

6. The portable table and hand truck as defined in claim 1, wherein said third U-shaped member includes a plurality of load supporting members extending between and mounted to the legs of said third U-shaped member.

7. The portable table and hand truck as defined in claim 6, wherein said load supporting rack additionally includes a fourth U-shaped member having its legs mounted to the middle portion of the third U-shaped member and extending at least partially about said wheel supporting means.

8. The portable table and hand truck as defined in claim 6, wherein the legs of the third U-shaped member are positioned exteriorly along said wheel supporting means with respect to the legs of said second U-shaped member.

9. The portable table and hand truck as defined in claim 1, wherein said depending portions extending from one surface of said table top are integral with said table top and extend generally perpendicularly from the side edges of said table top.

10. The portable table and hand truck as defined in claim 9, wherein said depending portions are integral with said table top and extend generally perpendicularly from the edges of said table top, said depending end portions being integral with said depending portions extending from the side edges of said table top, thereby forming depending corners thereof.

11. The portable table and hand truck as defined in claim 9, wherein said depending portions define a plurality of hook receiving apertures spaced apart from said stop means.

12. The portable table and hand truck as defined in claim 11, wherein said load supporting rack retaining means comprises a pair of chains mounted at one of their ends thereof to said rack and having hooks mounted to their other ends, said hooks being engagable with the hook receiving apertures of said depending portions of said table top for supporting and retaining said rack in a plurality of load supporting positions with respect to said table top.

13. The portable table and hand truck as defined in claim 12, additionally having second load retaining means extending from said load supporting rack to the underside of said table top for retaining a load supported on said load supporting rack.

14. The portable table and hand truck as defined in claim 13, wherein said second load retaining means comprises at least one strap having one end portion thereof removably retained on said load supporting rack and the other end portion thereof removably retained on said stop means.

15. The portable table and hand truck as defined in claim 14, wherein said second load retaining means comprises a pair of straps having hooks at the ends thereof adapted to removably engage said load supporting rack and said stop means.

16. The portable table and hand truck as defined in claim 15, wherein said straps are self-extendable and retractable cord members.

* * * * *